United States Patent
Youakim et al.

(10) Patent No.: US 12,293,205 B2
(45) Date of Patent: May 6, 2025

(54) SYSTEM AND METHODS FOR PROVISIONING DIFFERENT VERSIONS OF A VIRTUAL APPLICATION

(71) Applicant: Citrix Systems, Inc., Fort Lauderdale, FL (US)

(72) Inventors: Nabeel Youakim, Lauderdale by the Sea, FL (US); P. J. Hough, Mountain View, CA (US)

(*) Notice: Subject to any disclaimer, the term of this patent is extended or adjusted under 35 U.S.C. 154(b) by 452 days.

(21) Appl. No.: 17/446,840

(22) Filed: Sep. 3, 2021

(65) Prior Publication Data

US 2021/0397472 A1   Dec. 23, 2021

Related U.S. Application Data

(63) Continuation of application No. 16/585,173, filed on Sep. 27, 2019, now Pat. No. 11,126,455.

(51) Int. Cl.
  *G06F 9/455*   (2018.01)
  *G06F 8/65*    (2018.01)
  *G06F 8/71*    (2018.01)

(52) U.S. Cl.
  CPC ............ *G06F 9/45558* (2013.01); *G06F 8/65* (2013.01); *G06F 8/71* (2013.01); *G06F 2009/45595* (2013.01)

(58) Field of Classification Search
  CPC .......... G06F 9/45558; G06F 8/65; G06F 8/71; G06F 2009/45595
  See application file for complete search history.

(56) References Cited

U.S. PATENT DOCUMENTS

| | | | |
|---|---|---|---|
| 8,904,081 B1 * | 12/2014 | Kulkarni | G06F 3/0608 |
| | | | 718/1 |
| 9,117,079 B1 * | 8/2015 | Huang | G06F 9/44505 |
| 9,489,516 B1 * | 11/2016 | Lu | G06F 21/567 |
| 9,753,759 B2 | 9/2017 | Dhawan et al. | |
| 10,025,927 B1 | 7/2018 | Khalid et al. | |
| 2005/0172279 A1 * | 8/2005 | Cook | G06F 8/61 |
| | | | 717/162 |
| 2006/0005132 A1 * | 1/2006 | Herdeg, III | G06F 11/3684 |
| | | | 714/E11.193 |

(Continued)

FOREIGN PATENT DOCUMENTS

| | | |
|---|---|---|
| CN | 104111966 | 10/2014 |
| CN | 107003862 | 8/2017 |
| CN | 109614165 | 4/2019 |
| JP | 2001022734 | 1/2001 |
| JP | 2013-84235 | 10/2014 |
| JP | 2017-534107 | 11/2017 |

OTHER PUBLICATIONS

Margaret Rouse SearchVirtualDesktop.com—Citrix App Layering (formerly Citrix AppDisk) https://searchvirtualdesktop.techtarget.com/definition/Citrix-AppDisk?vgnextfmt=print; Citrix Synergy 2018 conference coverage; Retreived from internet Sep. 16, 2019; pp. 2 ***See U.S. Appl. No. 16/585,173.

(Continued)

*Primary Examiner* — Jacob D Dascomb

(57) ABSTRACT

A computing device may include a memory and a processor cooperating with the memory and configured to provide first and second application layers that include different versions of a virtual application accessible by a client device. The first and second versions of the virtual application are isolated from each other in their respective application layers, each with separate application libraries.

11 Claims, 11 Drawing Sheets

(56) References Cited

U.S. PATENT DOCUMENTS

| | | | | |
|---|---|---|---|---|
| 2008/0313257 A1* | 12/2008 | Allen | ............... | G06F 9/44505 |
| | | | | 709/201 |
| 2016/0191645 A1 | 6/2016 | Hayton et al. | | |
| 2017/0090960 A1 | 3/2017 | Anderson et al. | | |
| 2017/0168861 A1 | 6/2017 | Dhawan et al. | | |
| 2017/0200122 A1* | 7/2017 | Edson | ............... | H04L 63/104 |
| 2020/0026540 A1* | 1/2020 | Venkatesh | ............. | G06F 9/5077 |
| 2020/0349019 A1* | 11/2020 | Dawkins | ............... | G06F 16/172 |

OTHER PUBLICATIONS

Rouse et al. "application containerization (app containerization)" https://searchitoperations.techtarget.com/definition/application-containerization-app-containerization?vgnextfmt=print; This content is part of the Essential Guide: Containers-as-a-service providers take some pressure off IT: retrieved from internet Sep. 16, 2019; pp. 3 ***See U.S. Appl. No. 16/585,173.

Dirk Merkel "Docker: Lightweight Linux Containers for Consistent Development and Deployment" Linux Journal, vol. 2014 Issue 239, Mar. 2014, Mar. 1, 2014; retrieved on Feb. 20, 2015 pp. 76-91. ***See U.S. Appl. No. 16/585,173.

Anonymous "A detailed comparison between the functionality of PHP 4 and PHP 5" Retrieved from the nternet: RL: http://web.archive.org/web/0150926163955/ ttps//www.ntchosting. com/encyclopedia/scripting-and-programming /php/php4-php5-comparison/ [retrieved on Nov. 5, 2020; Sep. 26, 2015; pp. 9 ***See U.S. Appl. No. 16/585,173.

* cited by examiner

SYSTEM AND METHODS FOR PROVISIONING DIFFERENT VERSIONS OF A VIRTUAL APPLICATION

RELATED APPLICATIONS

This application is a continuation of U.S. application Ser. No. 16/585,173 filed Sep. 27, 2019, which is hereby incorporated herein in its entirety by reference.

BACKGROUND

Many organizations are now using application and/or desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client device.

There are several different types of desktop virtualization systems. As an example, Virtual Desktop Infrastructure (VDI) refers to the process of running a user desktop and/or application inside a virtual machine that resides on a server. Virtualization systems may also be implemented in a cloud computing environment, or cloud system, in which a pool of computing resources (e.g., desktop virtualization servers), storage disks, networking hardware, and other physical resources may be used to provision virtual desktops, and/or provide access to shared applications.

SUMMARY

A computing device may include a memory and a processor cooperating with the memory and configured to provide first and second application layers that include different versions of a virtual application accessible by a client device. The first and second versions of the virtual application are isolated from each other in their respective application layers, each with separate application libraries.

In accordance with an example embodiment, the first application layer may further include at least one macro compatible with the first version of the virtual application and incompatible with the second version of the virtual application. Moreover, the processor may be configured to initially provide the first or second application layer for the client device at logon based upon a macro preference, for example.

In one example implementation, the first application layer may be locked to prevent updates thereto. In accordance with another example, the first and second application layers may be containerized. Furthermore, the second version of the virtual application may be generated after the first version of the virtual application in some embodiments. Additionally, the processor may be configured to simultaneously provide the first and second application layers to the client device in an example embodiment.

A related method may include, at a computing device, providing a first application layer including a first version of a virtual application accessible by a client device, and providing a second application layer including a second version of the virtual application different than the first version of the virtual application and also accessible by the client device. The first and second versions of the virtual application are isolated from each other in their respective application layers, each with separate application libraries.

A related non-transitory computer-readable medium is also provided having computer-executable instructions for causing a computing device to perform steps including providing a first application layer including a first version of a virtual application accessible by a client device, and providing a second application layer including a second version of the virtual application different than the first version of the virtual application and also accessible by the client device. The first and second versions of the virtual application are isolated from each other in their respective application layers, each with separate libraries.

DETAILED DESCRIPTION

In virtual computing systems, applications may be run within a virtual machine, in which each application is separated into different layers including the appropriate files, systems objects, and registry entries pertinent to that specific layer. Each application layer may be stored as its own virtual disk, and the application layers run over top of an operating system (OS) layer. While this approach helps simplify the environment and helps reduces management time/complexity associated with application updates, etc., it may create potential issues as well. Over time, macroinstruction programs (also called macros) may be created for certain applications to automate common tasks or operations, for example. However, in many cases such macros will not be compatible with later (newer) versions of the same application, leading to lost and or "broken" macros and a degraded user experience (UX) for the users who rely on such macros.

The configurations set forth herein advantageously overcome these technical challenges by allowing for the creation of "golden" images that include the requisite application and macro components within a same application layer that are known to work together, and thereby preserved in a proven working form factor. Moreover, other (e.g., newer) versions of the application may also be provided within separate respective application layers, thereby allowing both versions of the application to co-exist within a same virtual machine, and to even be run at the same time, which would otherwise not be possible for traditional desktop computing configurations.

Figure 1:
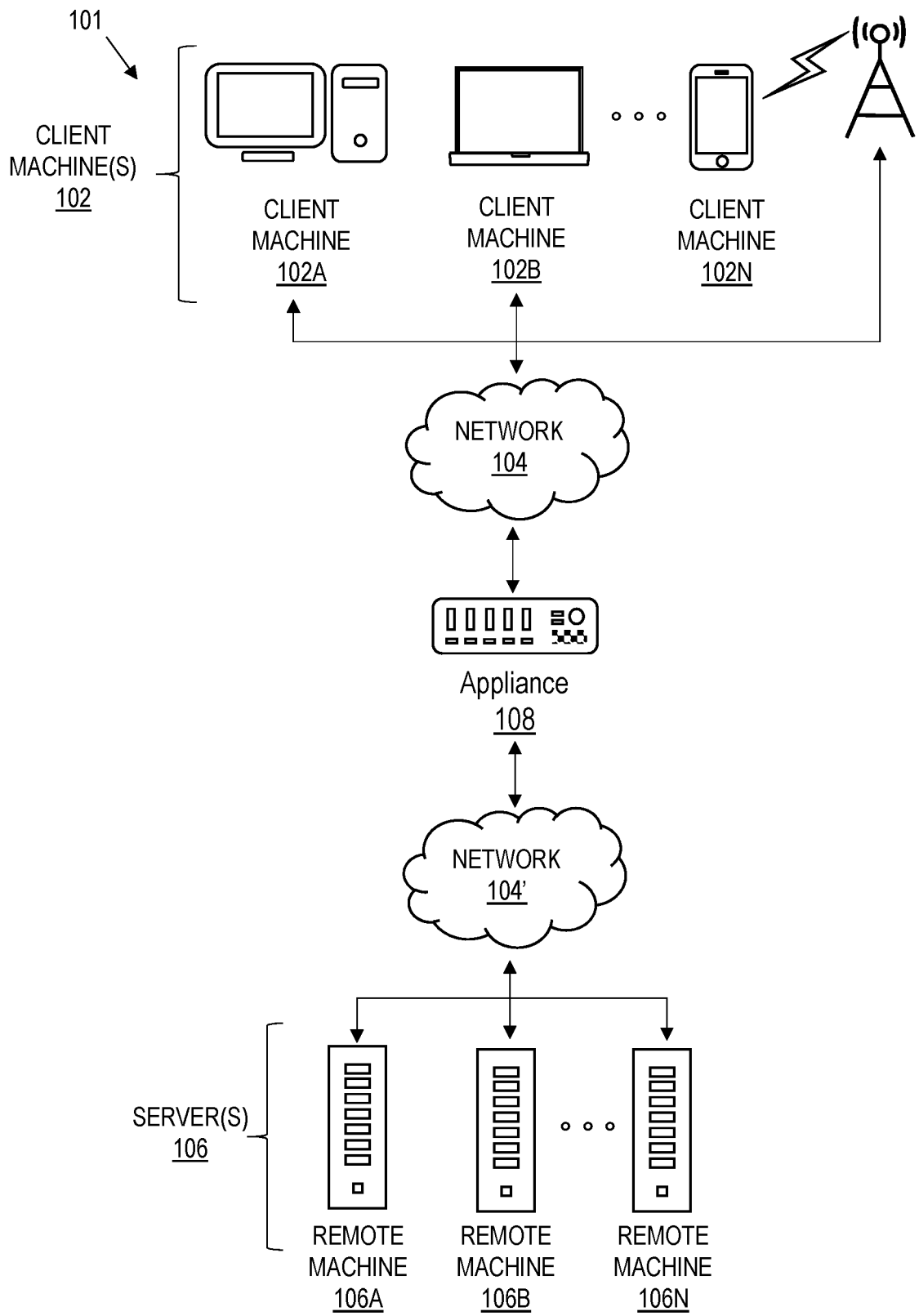
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 108 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
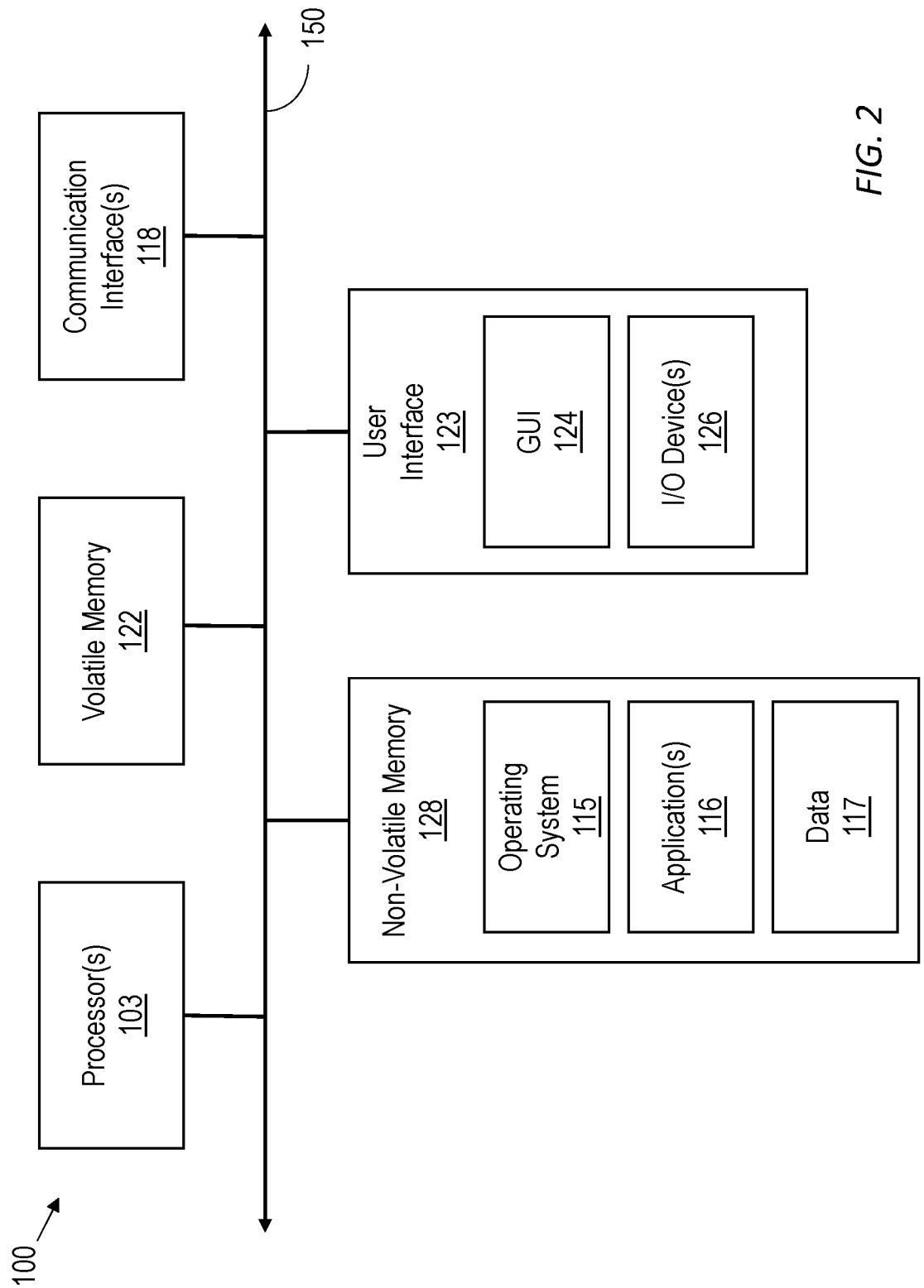
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Florida ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
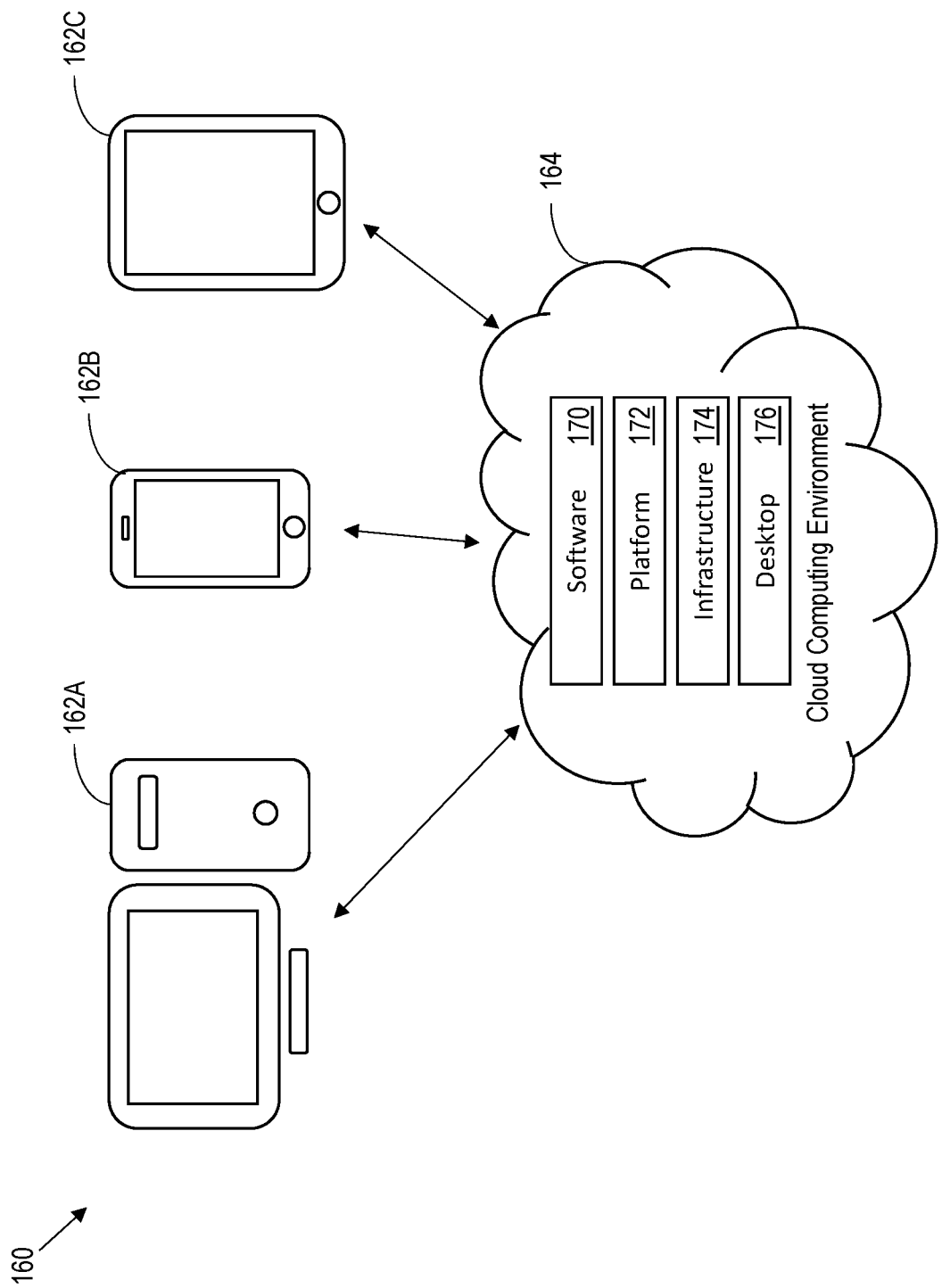
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Washington (herein "Azure"), or AMAZON WEB SERVICES provided by Amazon.com, Inc., of Seattle, Washington (herein "AWS"), for example. In the case of Citrix Cloud, Citrix Workspace app may be used as a single-entry point for bringing apps, files and desktops together (whether on-premises or in the cloud) to deliver a unified experience.

Figure 4:
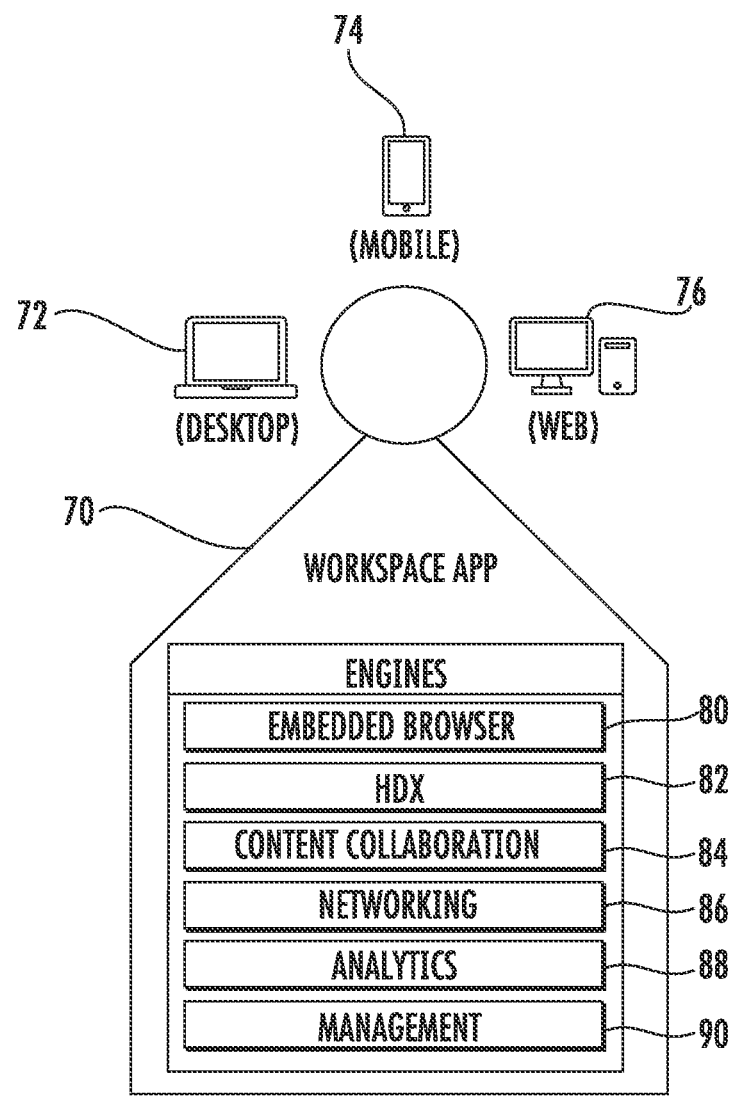
FIG. 4 is a schematic block diagram of desktop, mobile and web based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, Web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and Web apps contained within the workspace app 70 instead of launching them on a locally installed and unmanaged browser. With the embedded browser, the workspace app 70 is able to intercept user-selected hyperlinks in SaaS and Web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific μ-VPN connection. A μ-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
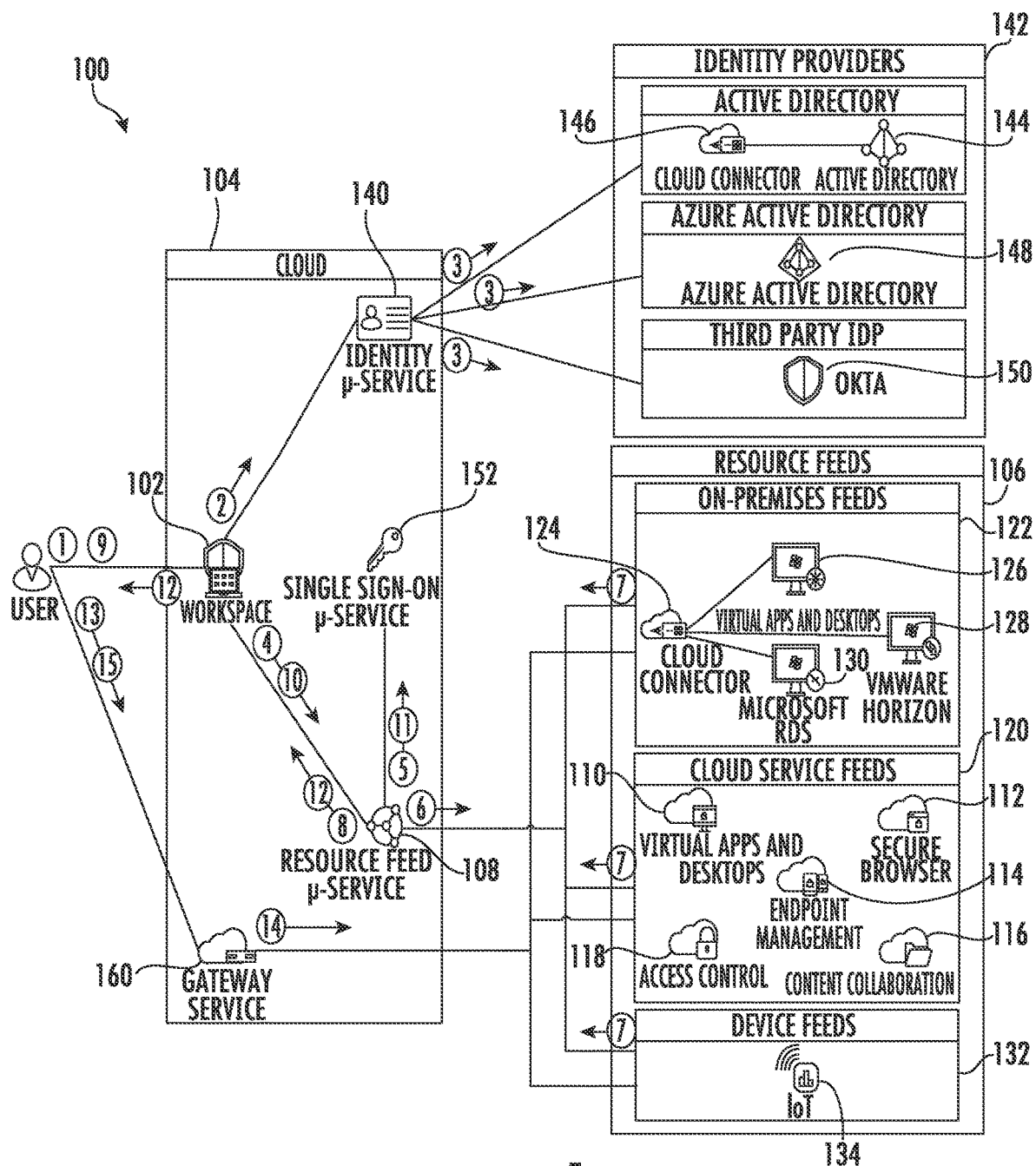
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Cloud 104. The workspace experience service 102 then pulls in all the different resource feeds 16 via a resource feed micro-service 108. That is, all the different resources from other services running in the Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Cloud 104, and presenting their identity (event 1). The identity includes a user name and password, for example.

The workspace experience service 102 forwards the user's identity to an identity micro-service 140 within the Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11).

The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

Figure 6:
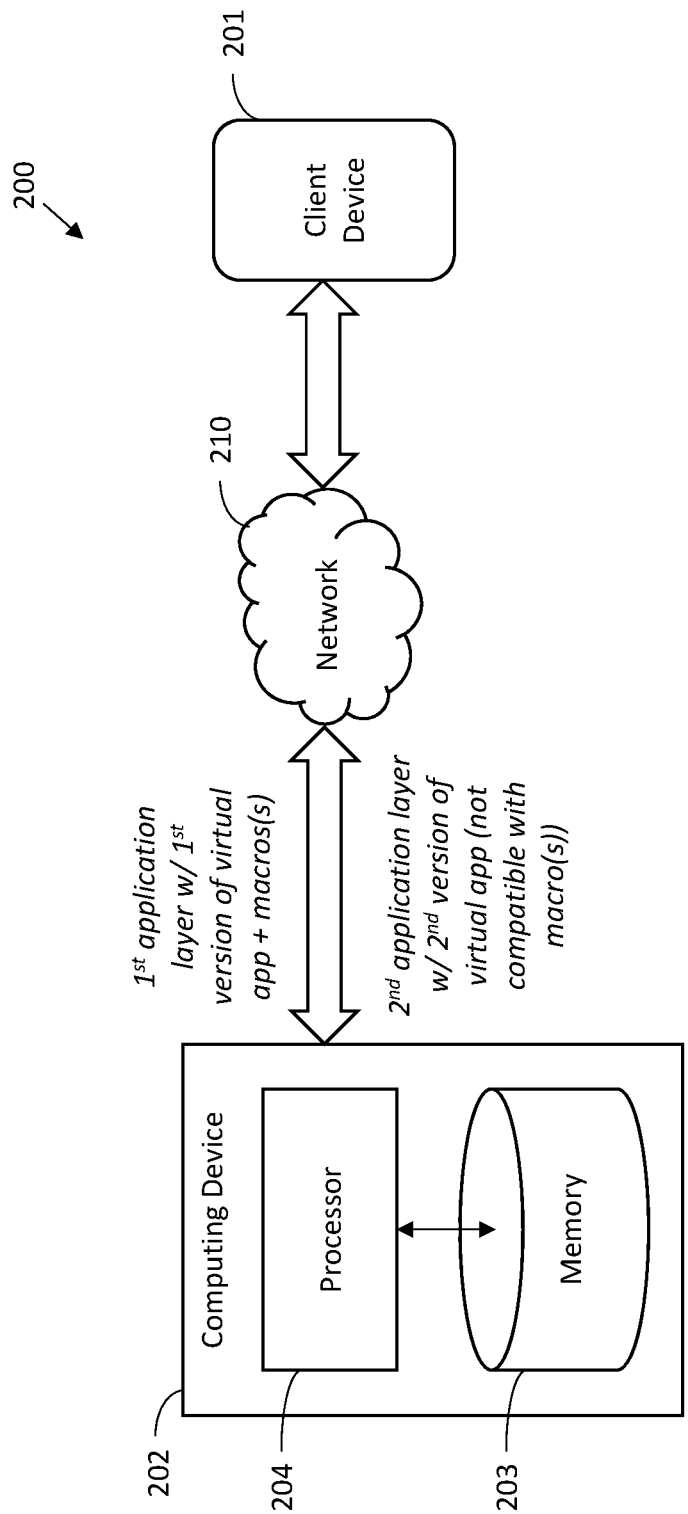
FIG. 6 is a schematic block diagram of a computing system providing for different versions of a same application to be run within a virtual machine in different application layers.
Figure 7:
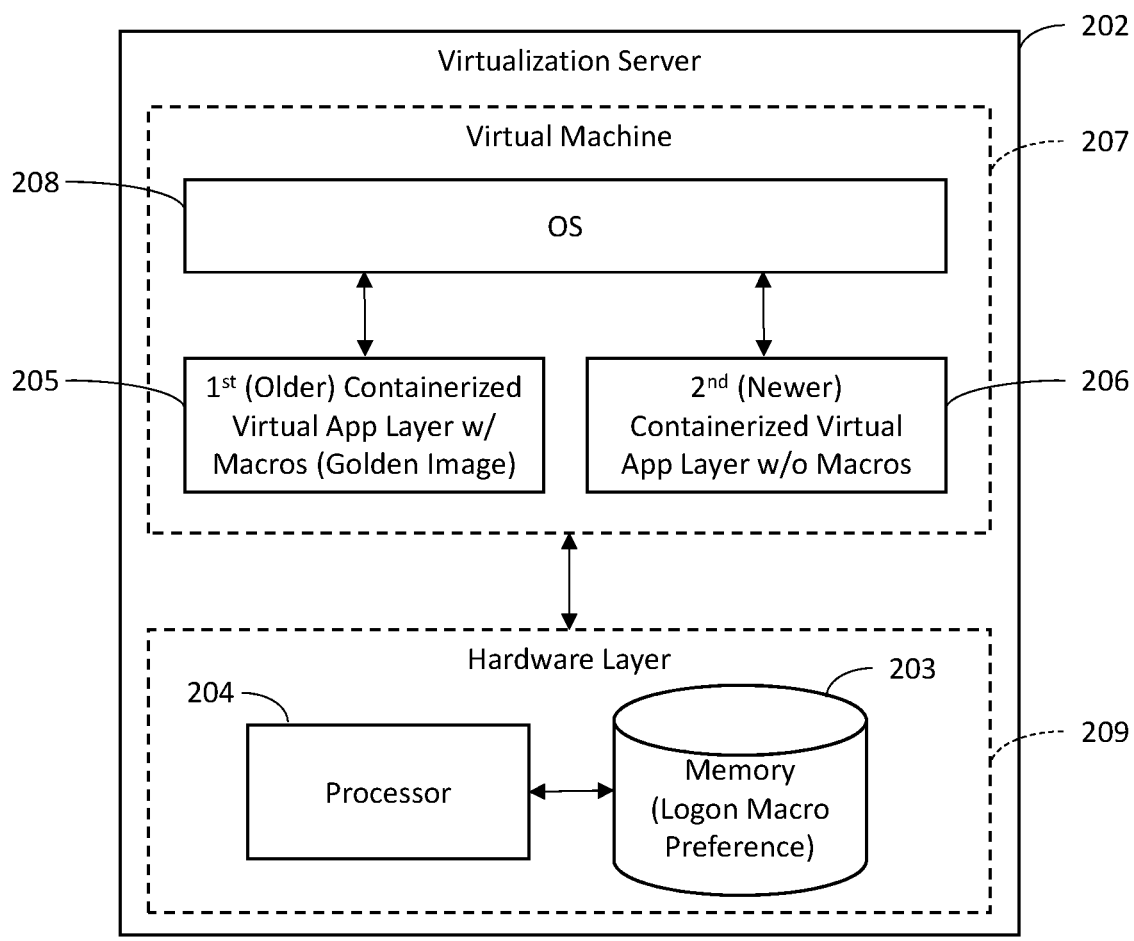
FIG. 7 is a schematic block diagram of an example implementation of the virtualization server of the system of FIG. 6.

Turning to FIGS. 6-7, a computing system 200 is first described that illustratively includes a client computing device 201, which may be similar to those described above, and is configured to access a virtual application from a computing device 202 via a network 210 (e.g., the Internet). Furthermore, the computing device (e.g., a virtualization server) 202, which may be similar to those described above, illustratively includes a memory 203 and a processor 204 at a hardware layer 209. The processor 204 cooperates with the memory 203 and is configured to provide a first application layer 205 within a virtual machine 207 along with an operating system (OS) layer 208 (e.g., Windows, LINUX, etc.) responsive to the client device 201. The server 202 is also configured to provide a second application layer 206 within the virtual machine 207 on top of the OS layer 208 responsive to selection thereof by the client device 201.

More particularly, the first application layer 205 includes a first version of a first virtual application and a second virtual application(s) compatible with the first version of the first virtual application. Moreover, the second application layer 206 includes a second version of the first virtual application in the first application layer, but the second version is different (e.g., newer) than the first version (in other words, they are different versions of the same virtual application). Furthermore, the second version of the first virtual application is not compatible with the second virtual application in the first application layer 205. In the example shown in FIG. 7, the second version of the first virtual application in the second application layer 206 is a newer version than the version of the first virtual application in the first application layer 205.

In the example illustrated in FIG. 7, the second virtual applications are macros, which are relatively short programs or subroutines that are used in conjunction with or on top of another program. However, as will be discussed further below, the second virtual application(s) within the first application layer may be stand-alone programs in some embodiments that are capable of running independently of the first virtual application. As noted above, macros created for an older version of a virtual application may not operate properly, or otherwise be incompatible, with a newer version of the application, as is the case in the present example. By way of example, database programs such as MICROSOFT ACCESS allow users to build macros that run on the ACCESS platform or framework. However, when the version of ACCESS changes then the database macros built on this version may no longer work properly. Other examples of applications for which macros may fail to operate correctly upon being updated may include SAP applications, spreadsheets (e.g., MICROSOFT EXCEL), word processors (e.g., MICROSOFT WORD), etc.

The given application files and associated macros that are known to work together may be combined in a "golden image" that is locked from further updates. A golden image is a pre-configured template for a virtual machine, virtual desktop, or in this case virtual applications, that includes the appropriate resources for a specific user or user group. In an example embodiment, the application files/macros may be containerized within the application layer in a golden image, although containerization need not be used in all embodiments. A container may include the appropriate runtime components (e.g., files, environment variables, libraries, etc.) allowing deployment of an application(s) without launching an entire virtual machine. When the newer or upgraded version of the application is to be rolled out, it is similarly deployed in such a way that it runs independently from the first application layer 205, in that the first and second application layers do not rely on the same files, libraries, etc. That is, the first and second virtual applications do not share common files or libraries that may otherwise result in conflicts between them, and they are accordingly self-contained. Yet, the older version of the virtual application may still run with its associated applications/macros in the golden image, within the same virtual machine 208 as the second application layer 206, and even at the same time. Since they are running in separate application layers, they are isolated and do not conflict with one another.

By way of contrast, running different versions of a same program within a local desktop environment would typically not be possible, particularly if they are to be run at the same time. For example, both versions of the application may attempt to access common files, libraries, etc., causing conflicts or other incompatibility issues. Yet, because the first and second application layers are self-contained (and optionally containerized), they may be run separately or at the same time within the same virtual machine 207, providing enhanced convenience, productivity, and/or user experience.

In accordance with one example implementation, the virtualization server 202 may provide the first and second application layers 205, 206 using an application layering solution such as Citrix App Layering. Citrix App Layering's underlying technology enables components of a virtual machine to be independently assigned, patched, and updated. This includes the OS, applications, and user's settings and data. Citrix App Layering enables information technology (IT) personnel to deliver applications via a virtual machine/golden image that look, act and feel as if they are installed locally, but these applications are actually stored elsewhere as separate manageable objects in their own virtual disks. With Citrix App Layering, applications can be separated from the OS, allowing IT to focus on managing a single OS layer regardless of the number of machine configurations (e.g., pools, silos, delivery groups). In Citrix App Layering, a Layer is a container for the file system objects and registry entries unique to that layer. As an example, an "Application Layer" includes the files and registry entries that have been added, changed or even removed during the application installation onto an operating system. However, it will be appreciated that other suitable application layering and/or containerization approaches besides Citrix App Layering may be used in different embodiments.

Figure 8:
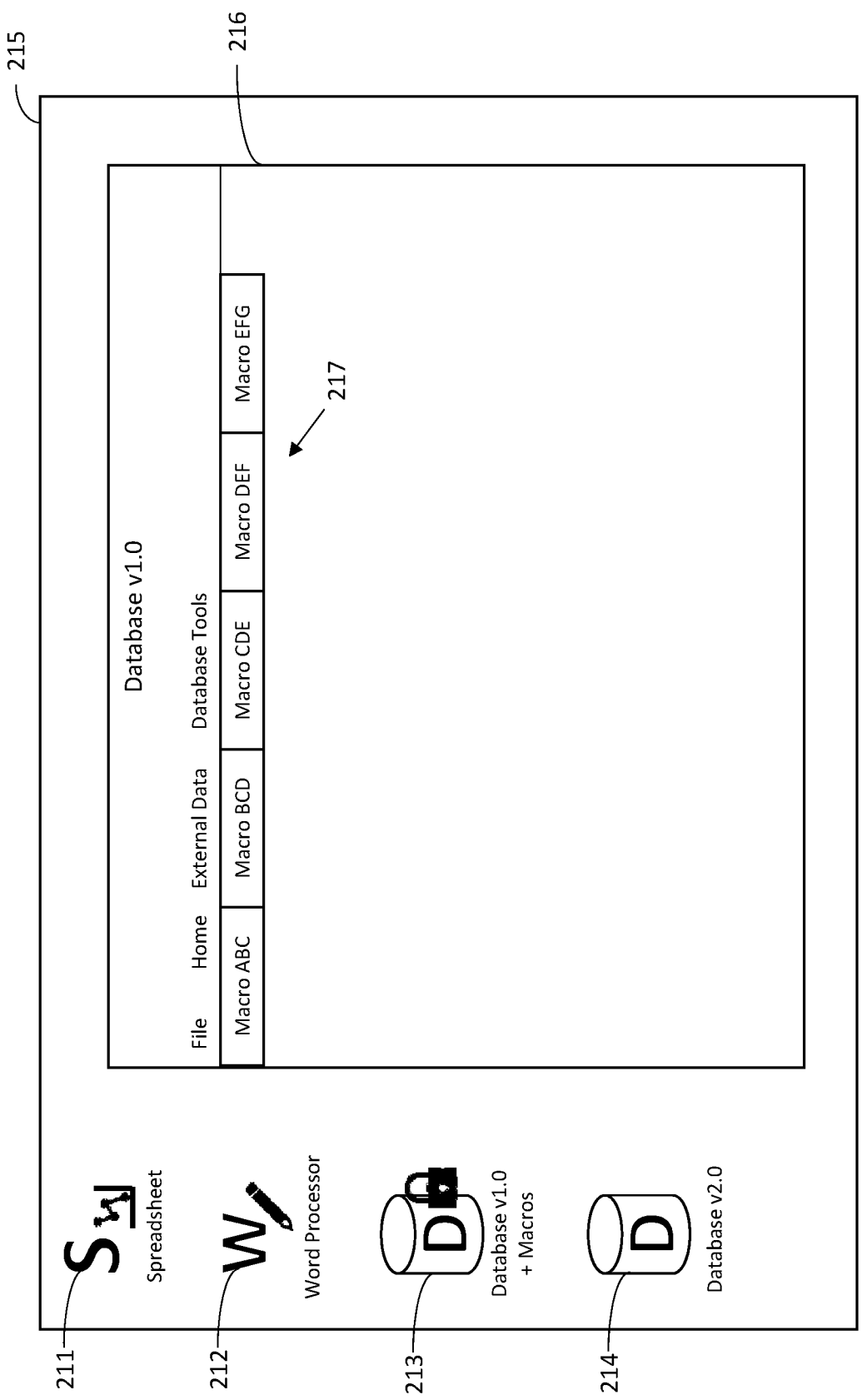
FIGS. 8-10 are display views associated with the client device of the system of FIG. 6 illustrating operation of an example implementation.
Figure 9:
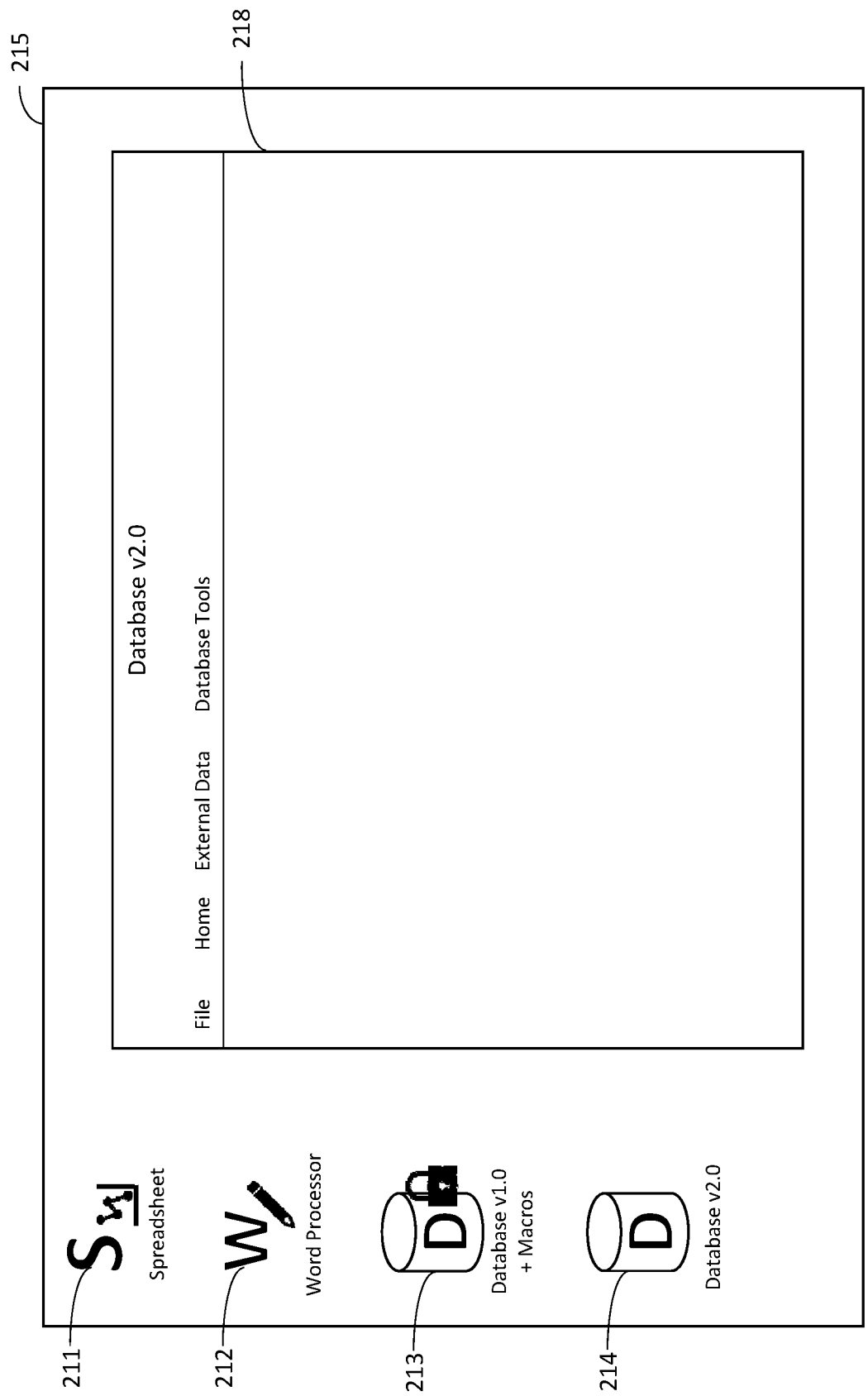
Figure 10:
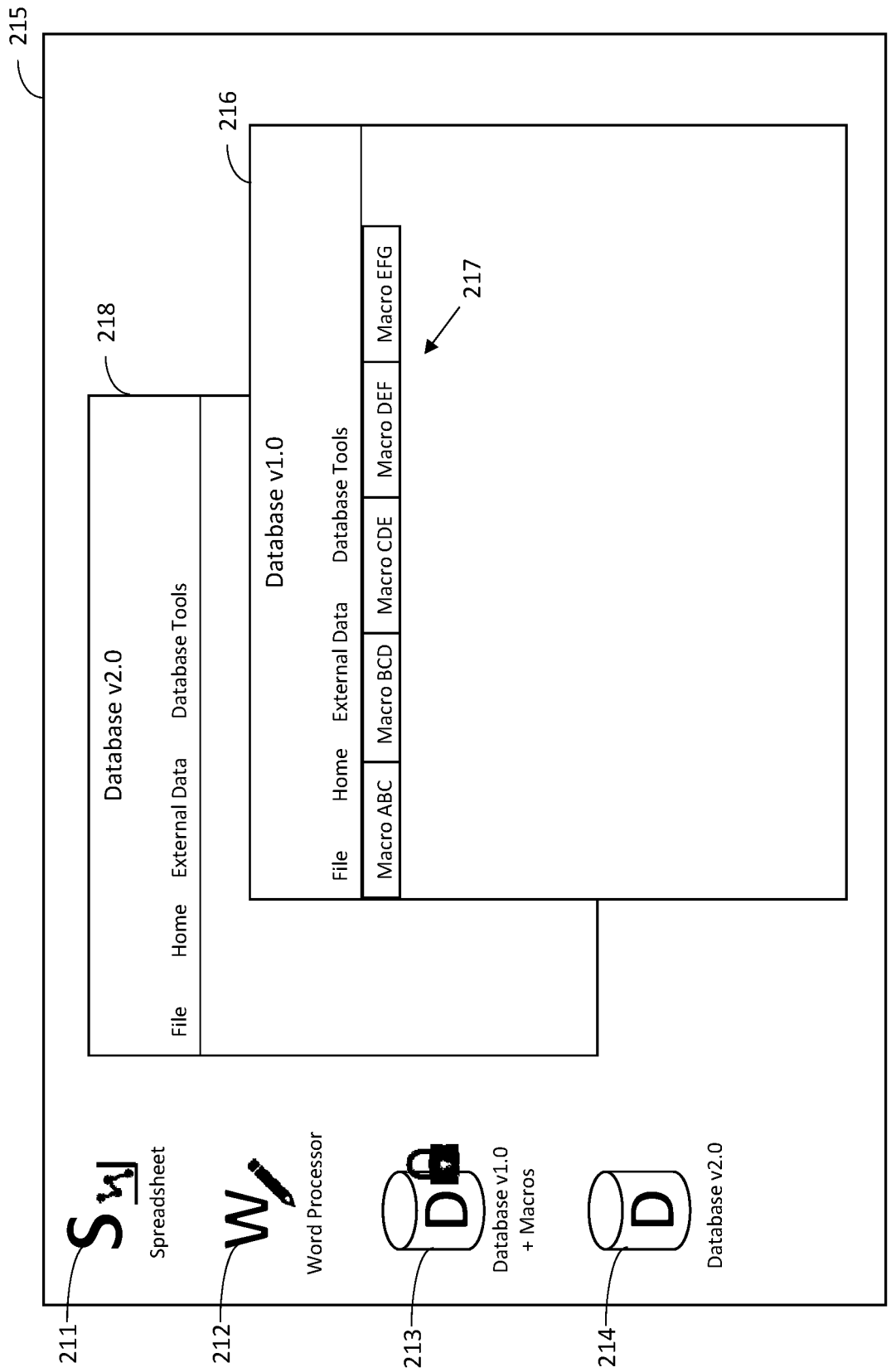

Referring additionally to FIGS. 8-10, in example is illustrated in which the virtual machine 207 provides access to four separate applications, which are a spreadsheet program, word processing program, a first version (v1.0) of a database program with associated macros, and a second version (v2.0) of the same database program, which are respectively represented by icons 211-214 shown on a display 215 of the client device 201. In addition to the database symbol in the icon 213, this icon also illustratively includes a lock symbol 219 to indicate that this is a golden image in which the given version of the database application (v1.0) and its associated macros are locked down in the application layer, and accordingly may not be added to or otherwise altered by the user (although alteration by an IT administrator may be permitted). This advantageously helps ensure that a consistently operational version of the database application with its associated compatible macro(s) will always be available.

In the example shown in FIG. 8, the icon 213 has been selected through a user interface (UI) of the client device 201, opening a window 216 in which the older (v1.0) version of the virtual database application is running. Moreover, in this window, respective tabs or buttons 217 are provided for accessing a plurality of different database macros (Macro ABC, Macro BCD, Macro CDE, Macro DEF, and Macro EFG), which are locked with the database v1.0 application in the golden image. In the example of FIG. 9, the icon 214 has been selected, and the newer version (v2.0) of the database application is launched and runs within a window 218. In other words, FIG. 8 illustrates the case when just the older version (v1.0) of the virtual database application is running, and FIG. 9 illustrates the case when only the newer version (v2.0) of the database application is running. In the example of FIG. 10, both of the icons 213, 214 have been selected, and both of the database application layers (for v1.0 and v2.0) are both running simultaneously in the windows 216, 218, respectively. As noted above, this would typically not be possible with different versions of the same application locally installed on a client computing device.

In one example implementation, IT personnel may create the golden image (here the first application layer 205 and associated macros) to ensure sure that all of the programs work correctly together within the same application layer, and then lock down this application layer so that it cannot be changed, as noted above. This allows for an application version and macros that are proven to work together, and which cannot be changed without IT intervention. This also allows for accessing of the golden image (e.g., via a subscription or license) for a set period of time separate and apart from other versions of an application that a user may have, or as a stand-alone virtual software package. In this regard, it should be noted that more than one virtual application may be bundled in a golden image in some embodiments, if desired. For example, this may allow two different applications to interoperate, such as a first application layer including App X(v1) and App Y(v1), and a second application layer including App Y(v2). While App X(v1) and App Y(v2) may not be not interoperable, it may still interest a user to have access to App X(v1) when working with App Y(v1), and to also have access to App Y(v2) when not interoperating with App X. Again, the goal is to incorporate compatible applications and/or macros in the same golden image application layer that have been demonstrated to be compatible and that will work correctly for users "out of the box".

In the example of FIG. 7, the memory 203 also stores a logon macro preference, which allows the server 202 to initially provide the first or second version of the virtual application for the client device 201 at logon of the virtual machine based upon the macro preference. For example, the newer view of the application included in the second application layer 206 may become the default version listed in the startup menu and/or quick access bar, or the server 202 may even auto-start the second application layer at logon, if desired.

Figure 11:
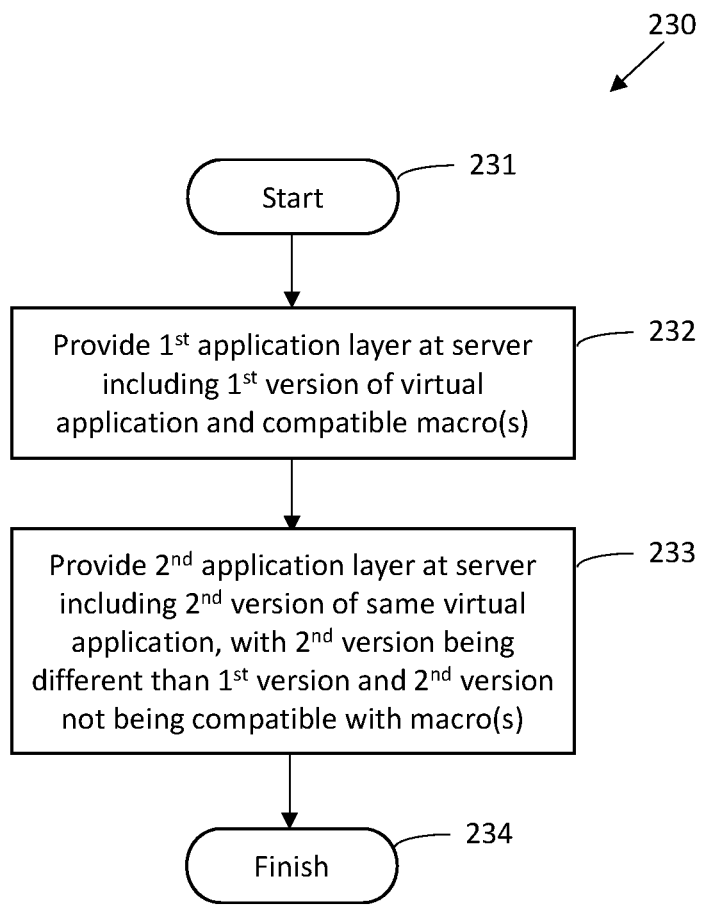
FIG. 11 is a flow diagram illustrating method aspects corresponding to the system of FIG. 6.

Referring additionally to the flow diagram 230 of FIG. 11, a related method may include providing a first application layer 205 within a virtual machine 207 at a server 202 responsive to a client device 201, at Block 232, with the first application layer including a first version of a first virtual application and one or more second virtual application (e.g., macros, etc.) compatible with the first version of the first virtual application, as noted above. The method further illustratively includes providing a second application layer 206 within the virtual machine 207 at the server 202 responsive to the client device 201, at Block 233, with the second application layer including a second version of the first virtual application, and the second version being different than the first version in the first application layer. As noted above, the second version of the virtual application is not compatible with the second virtual application(s). The method of FIG. 11 illustratively concludes at Block 234. As noted above, other steps may be included such as selection of a virtual application from a particular layer after the layer has been generated, changing from one application version to another responsive to selection from a user input device, etc.

As will be appreciated by one of skill in the art upon reading the foregoing disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. A computing device comprising:
a memory and a processor cooperating with the memory and configured to:
provide a first application layer stored on a first virtual disk and a second application layer stored on a second virtual disk separate from the first virtual disk, the first and second application layers including different versions of an application accessible by a client device, the first application layer including a first version of the application and the second application layer including a second version of the application; and
execute the first version of the application and the second version of the application simultaneously on a single virtual machine;
wherein the first and second versions of the application are isolated from each other in their respective application layers, each with separate application libraries,
wherein the first application layer further includes at least one macro compatible with the first version of the application and incompatible with the second version of the application,
wherein the processor is configured to initially provide the first or second application layer for the client device at logon based upon a macro preference.

2. The computing device of claim 1 wherein all application files and associated macros of the first application layer are locked to prevent updates thereto.

3. The computing device of claim 1 wherein the first and second application layers are containerized.

4. The computing device of claim 1 wherein the second version of the application is generated after the first version of the application.

5. A method comprising:
at a computing device,
providing a first application layer stored on a first virtual disk, the first application layer including a first version of an application accessible by a client device,
providing a second application layer stored on a second virtual disk separate from the first virtual disk, the second application layer including a second version of the application different than the first version of the application and also accessible by the client device, and
executing the first version of the application and the second version of the application simultaneously on a single virtual machine,
wherein the first and second versions of the application are isolated from each other in their respective application layers, each with separate application libraries,
wherein the first application layer further includes at least one macro compatible with the first version of the application and incompatible with the second version of the application,
wherein the first or second application layer is initially provided for the client device at logon based upon a macro preference.

6. The method of claim 5 wherein all application files and associated macros of the first application layer are locked to prevent updates thereto.

7. The method of claim 5 wherein the first and second application layers are containerized.

8. The method of claim 5 wherein the second version of the application is generated after the first version of the application.

9. A non-transitory computer-readable medium having computer-executable instructions for causing a computing device to perform steps comprising:
providing a first application layer stored on a first virtual disk, the first application layer including a first version of an application accessible by a client device,
providing a second application layer stored on a second virtual disk separate from the first virtual disk, the second application layer including a second version of the application different than the first version of the application and also accessible by the client device, and
executing the first version of the application and the second version of the application simultaneously on a single virtual machine,
wherein the first and second versions of the application are isolated from each other in their respective application layers, each with separate application libraries, wherein the first application layer further includes at least one macro compatible with the first version of the application and incompatible with the second version of the application, wherein the first or second application layer is initially provided for the client device at logon based upon a macro preference.

10. The non-transitory computer-readable medium of claim 9 wherein all application files and associated macros of the first application layer are locked to prevent updates thereto.

11. The non-transitory computer-readable medium of claim 9 wherein the first and second application layers are containerized.

\* \* \* \* \*